US010990829B2

(12) United States Patent
Cameron et al.

(10) Patent No.: US 10,990,829 B2
(45) Date of Patent: Apr. 27, 2021

(54) STITCHING MAPS GENERATED USING SIMULTANEOUS LOCALIZATION AND MAPPING

(71) Applicant: EntIT Software LLC, Sunnyvale, CA (US)

(72) Inventors: Pashmina Cameron, Cambridge (GB); David Collier, Cambridge (GB)

(73) Assignee: Micro Focus LLC, Santa Clara, CA (US)

( * ) Notice: Subject to any disclaimer, the term of this patent is extended or adjusted under 35 U.S.C. 154(b) by 124 days.

(21) Appl. No.: 15/581,953

(22) Filed: Apr. 28, 2017

(65) Prior Publication Data

US 2018/0315201 A1 Nov. 1, 2018

(51) Int. Cl.
*G06K 9/00* (2006.01)
*G06T 7/579* (2017.01)
(Continued)

(52) U.S. Cl.
CPC ....... *G06K 9/00758* (2013.01); *G05D 1/0231* (2013.01); *G05D 1/0246* (2013.01);
(Continued)

(58) Field of Classification Search
CPC ........... G06K 9/00624; G06K 9/00664; G06K 9/00744; G06K 9/00758; G06K 9/00765; G06K 9/00791; G06K 9/46; G06K 9/4638; G06K 9/6201; G06K 9/6203; G06K 9/6206; G06K 9/6211; G06K 9/6215; G06K 2009/4695; G06T 7/246; G06T 7/248; G06T 7/579; G06T 7/70; G06T 7/73;
(Continued)

(56) References Cited

U.S. PATENT DOCUMENTS 6,453,223 B1 * 9/2002 Kelly ................... G05D 1/0246
318/587
7,015,831 B2 3/2006 Karlsson et al.
(Continued)

OTHER PUBLICATIONS

Brian Williams, Georg Klein and Ian Reid, "Automatic Relocalization and Loop Closing for Real-Time Monocular SLAM", IEEE Transactions on Pattern Analysis and Machine Intelligence, vol. 33, No. 9, Sep. 2011, pp. 1699-1712. (Year: 2011).*
(Continued)

*Primary Examiner* — Eric Rush (57) ABSTRACT

In some examples, a camera tracking failure in a simultaneous localization and mapping (SLAM) process with respect to a first SLAM map may be identified. Responsive to identification of the camera tracking failure, a second SLAM map for the SLAM process may be initialized. A video frame tracked through the second SLAM map may be accessed. Matched features between the video frame and individual keyframes of the first SLAM map may be identified to determine a keyframe subset. The keyframe subset may be analyzed to determine a candidate camera position from among the keyframe subset. The candidate camera position may be tracked with respect to the first SLAM map for subsequent video frames. The first SLAM map may be stitched to the second SLAM map responsive to tracking the candidate camera position with respect to the first SLAM map for the subsequent.

14 Claims, 5 Drawing Sheets

(51) Int. Cl.
*G06T 7/246* (2017.01)
*G05D 1/02* (2020.01)
*G06K 9/62* (2006.01)
*G06T 7/70* (2017.01)
*G06K 9/46* (2006.01)

(52) U.S. Cl.
CPC ..... *G06K 9/00664* (2013.01); *G06K 9/00744* (2013.01); *G06K 9/00791* (2013.01); *G06K 9/6201* (2013.01); *G06T 7/246* (2017.01); *G06T 7/579* (2017.01); *G06T 7/70* (2017.01); *G06K 2009/4695* (2013.01); *G06T 2207/10016* (2013.01); *G06T 2207/30232* (2013.01); *G06T 2207/30236* (2013.01)

(58) Field of Classification Search
CPC ...... G06T 7/97; G05D 1/0231; G05D 1/0246; G05D 1/0274; G01C 21/206; G01C 21/28; G01C 21/30; G01C 21/32
USPC ....... 382/100, 103, 104, 113, 153, 154, 181, 382/190, 192, 209, 210, 216, 284, 291, 382/294, 325; 348/113, 116, 118, 119; 701/1–3, 23–26, 28, 400, 408–411, 701/445–447, 450, 518–520, 523; 901/1
See application file for complete search history.

(56) References Cited

U.S. PATENT DOCUMENTS

| | | | | |
|---|---|---|---|---|
| 9,177,404 | B2* | 11/2015 | Ramachandran | G06K 9/38 |
| 9,390,344 | B2 | 7/2016 | Pirchheim et al. | |
| 9,495,761 | B2* | 11/2016 | Gauglitz | G06T 7/579 |
| 9,811,731 | B2* | 11/2017 | Lee | G06K 9/00624 |
| 10,027,952 | B2* | 7/2018 | Karvounis | G06K 9/00201 |
| 10,584,971 | B1* | 3/2020 | Askeland | G01C 21/3676 |
| 2012/0300979 | A1* | 11/2012 | Pirchheim | G06T 7/246 382/103 |
| 2012/0306847 | A1* | 12/2012 | Lim | G06K 9/00744 345/418 |
| 2012/0306850 | A1* | 12/2012 | Balan | G06F 3/0304 345/419 |
| 2013/0216098 | A1* | 8/2013 | Hasegawa | G06K 9/00664 382/103 |
| 2014/0229053 | A1* | 8/2014 | Tanaka | G05D 1/0272 701/25 |
| 2014/0267234 | A1* | 9/2014 | Hook | G06T 19/006 345/419 |
| 2015/0086084 | A1* | 3/2015 | Falconer | G06K 9/00664 382/113 |
| 2016/0117822 | A1* | 4/2016 | Yii | G06T 7/77 382/107 |
| 2016/0179830 | A1* | 6/2016 | Schmalstieg | G06F 17/30333 707/722 |
| 2016/0379092 | A1* | 12/2016 | Kutliroff | G06K 9/6262 382/158 |
| 2017/0177937 | A1* | 6/2017 | Harmsen | G06K 9/6215 |
| 2017/0261985 | A1* | 9/2017 | Maeno | G05D 1/0274 |
| 2018/0089832 | A1* | 3/2018 | Liu | G06K 9/4642 |
| 2020/0098135 | A1* | 3/2020 | Ganjineh | G06K 9/00798 |

OTHER PUBLICATIONS

Martin A. Fischler and Robert C. Bolles, "Random Sample Consensus: A Paradigm for Model Fitting with Applications to Image Analysis and Automated Cartography", ACM, Readings in Computer Vision, 1987, pp. 726-740. (Year: 1987).*

Gerhard Reitmayr and Tom W. Drummond, "Going out: Robust Model-based Tracking for Outdoor Augmented Reality", IEEE/ACM International Symposium on Mixed and Augmented Reality, 2006, pp. 109-118. (Year: 2006).*

John G. Morrison, Dorian Galvez-Lopez, and Gabe Sibley, "Scalable Multirobot Localization and Mapping with Relative Maps", Apr. 2016 IEEE Control Systems Magazine, vol. 36, Issue 2, published Mar. 17, 2016, pp. 75-85. (Year: 2016).*

L. Riazuelo, Javier Civera and J. M. M. Montiel, "C2TAM: A Cloud framework for Cooperative Tracking and Mapping", Robotics and Autonomous Systems, vol. 62, Issue 4, Apr. 2014, pp. 401-413. (Year: 2014).*

L. Riazuelo, Javier Civera and J. M. M. Montiel, "C2TAM: A Cloud framework for Cooperative Tracking and Mapping", Robotics and Autonomous Systems, Nov. 2013, pp. 1-14 (Year: 2013).*

Michael Milford, "Vision-based place recognition: how low can you go?", The International Journal of Robotics Research, vol. 32, Issue 7, Jun. 2013, pp. 766-789 (Year: 2013).*

Angeli, A. et al., "Real-Time Visual Loop-Closure Detection", Universite Pierre et Marie Curie & ENSTA, Paris, France, 2008, 6 pages.

Gauglitz, S. et al., "Live Tracking and Mapping From Both General and Rotation-Only Camera Motion", Department of Computer Science, University of California, Santa Barbara, Nov. 5-8, 2012, 10 pages.

Mulloni, A. et al. "User Friendly SLAM Initialization." Mixed and Augmented Reality (ISMAR), 2013 IEEE International Symposium on. IEEE, 2013, 10 pages.

Singhal, P. et al., "Multi-Modal Tracking for Object Based SLAM", arXiv preprint arXiv:1603.04117, 2016, 8 pages.

Teixeira, L., et al., "Indoor Localization Using SLAM in Parallel With a Natural Marker Detector." Proceedings of the 28th Annual ACM Symposium on Applied Computing, ACM, 2013, 7 pages.

* cited by examiner

STITCHING MAPS GENERATED USING SIMULTANEOUS LOCALIZATION AND MAPPING

BACKGROUND

Various techniques may be used to construct a map of an unknown environment. These techniques may include tracking the position of a camera that is used to capture frames of the map.

BRIEF DESCRIPTION

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

In some examples, a technique called simultaneous localization and mapping (SLAM) may be used to construct a map of an unknown environment and to track the position of a camera that is used to capture frames of the map. The map may include a three-dimensional (3D) description of a scene being viewed by the camera.

In some implementations, a SLAM map may include a sparse set of features selected from parts of the scene, along with an estimation of the positions of each of these features and descriptions of the appearance of the scene at each feature. In some examples, the SLAM map may include a succession of video frames defining the above data in the SLAM map. The video frames may be two-dimensional.

The selection of the sparse set of features may be performed as follows. When generating the SLAM map, the camera may process successive video frames. Each video frame may include a set of distinctive locations, such as corners or edges, where sparse features may be extracted. Distinctive locations may be selected using various algorithms. Example corner detection algorithms include accelerated segment (FAST), difference of Gaussians, and the Harris corner detector. The selected set of features may be "sparse" in the sense that the selected features may be stored in a small amount of memory relative to the total size of a given video frame. For example, 200 to 500 features may be identified for each video frame.

The SLAM map may also include a set of "keyframes", which is a subset of the video frames viewed by the camera. A keyframe is a video frame for which the SLAM map includes the estimated position and estimated orientation of the camera in that keyframe, in addition to the description of which sparse features were observed in that keyframe, and the 3D positions of the observed sparse features.

Sometimes during the SLAM process, the tracking of the camera's position may be lost. For example, the camera's position may be lost if the camera moves quickly to a part of the scene that has not yet been mapped. Sometimes it may be possible to quickly re-establish the camera's position within the existing map of the scene, i.e. to relocalize. However, if relocalizing fails or is not possible, because the camera has moved to a scene that has never been mapped before, then a new map may be initialized from the camera's current view, wherein the relationship between the new map and the old map is unknown.

In one approach, a new SLAM map may be initialized from the camera's current view and the new SLAM map may be generated over time when a new part of the scene is viewed. Then, two-dimensional keyframe images from the old SLAM map may be directly compared to two-dimensional keyframe images of the new SLAM map. The old and new SLAM maps may be stitched together into a combined SLAM map covering a combined scene based on a match found between a keyframe of the old SLAM map and a keyframe of the new SLAM map. As this technique may involve a direct comparison of two-dimensional keyframe images, the technique may work when the compared keyframes are nearly identical, including a close mapping of features and also a nearly identical camera position and angle. However, the technique may fail to stitch together the old and new SLAM maps in a variety of other situations, such as a change in camera position and/or angle. Additionally, the direct comparison of full sized keyframes will usually be computationally-intensive, which means map-stitching may take so long that the camera will have moved to a new part of the scene by the time the map-stitching is successful, which means tracking from the camera position (e.g. pose) found as a result of the successful map stitching is likely to fail. An alternative to this may be to downscale the keyframe images that are stored, but in this case, the ability to uniquely identify viewpoints may be reduced.

Accordingly, the present disclosure provides examples in which old and new SLAM maps may be stitched together into a combined SLAM map by comparing sparse features found in keyframes of the old SLAM map with sparse features found in keyframes of the new SLAM map, rather than through a direct comparison of keyframe images. The examples herein are robust to a wide variety of situations to allow successful stitching, including when camera angles in video frames of the new SLAM map are different from camera angles in video frames of the old SLAM map. Additionally, as features are stored in a sparse representation and due to the efficient feature analysis algorithms described herein, the examples herein may be less memory intensive and scale better (i.e. can handle larger amounts of SLAM map data).

Figure 1:
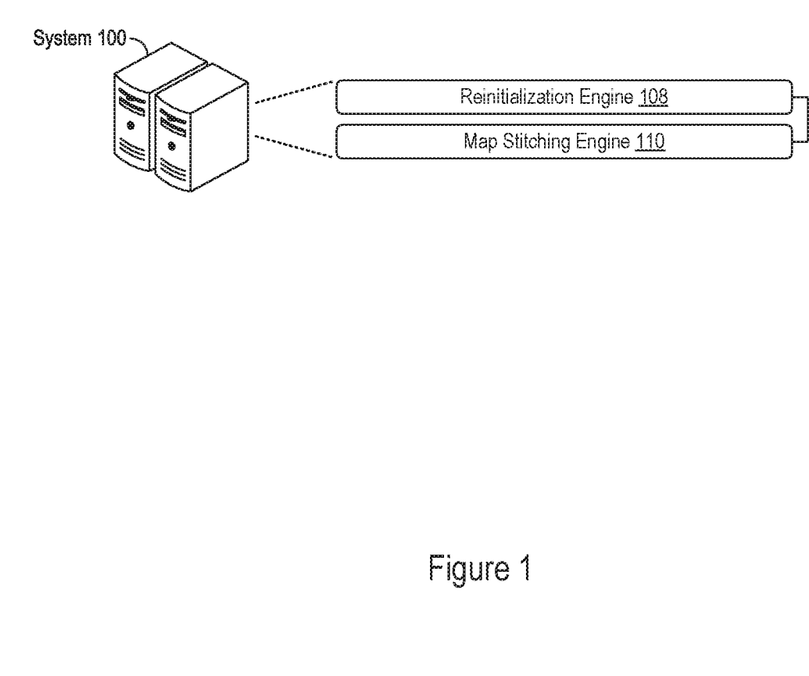
FIG. 1 is a block diagram illustrating a system according to some examples.

FIG. 1 is a block diagram illustrating a system 100 according to some examples. The system 100 may include a reinitialization engine 108 and a map stitching engine 110. The reinitialization engine may be configured to: identify a camera tracking failure in a simultaneous localization and mapping (SLAM) process with respect to a first SLAM map; and responsive to identification of the camera tracking failure, initialize a second SLAM map for the SLAM process. The map stitching engine 110 may be configured to access a video frame tracked through the second SLAM map; identify matched features between the video frame and individual keyframes of the first SLAM map to determine a keyframe subset; analyze the keyframe subset to determine a candidate camera position from among the keyframe subset; track the candidate camera position with respect to the first SLAM map for subsequent video frames; stitch the first SLAM map to the second SLAM map responsive to tracking the candidate camera position with respect to the first SLAM map for the subsequent video frames without experiencing a camera tracking failure.

Any of the "engines" in the present disclosure may be implemented as follows. In some examples, an engine may be a computing system including a processor, a memory such as non-transitory computer readable medium coupled to the processor, and instructions such as software and/or firmware stored in the non-transitory computer-readable storage medium. The instructions may be executable by the processor to perform processes defined herein. In some examples, an engine may include hardware features to perform processes described herein, such as a logical circuit, application specific integrated circuit, etc. In some examples, multiple components may be implemented using the same computing system features or hardware.

Figure 2:
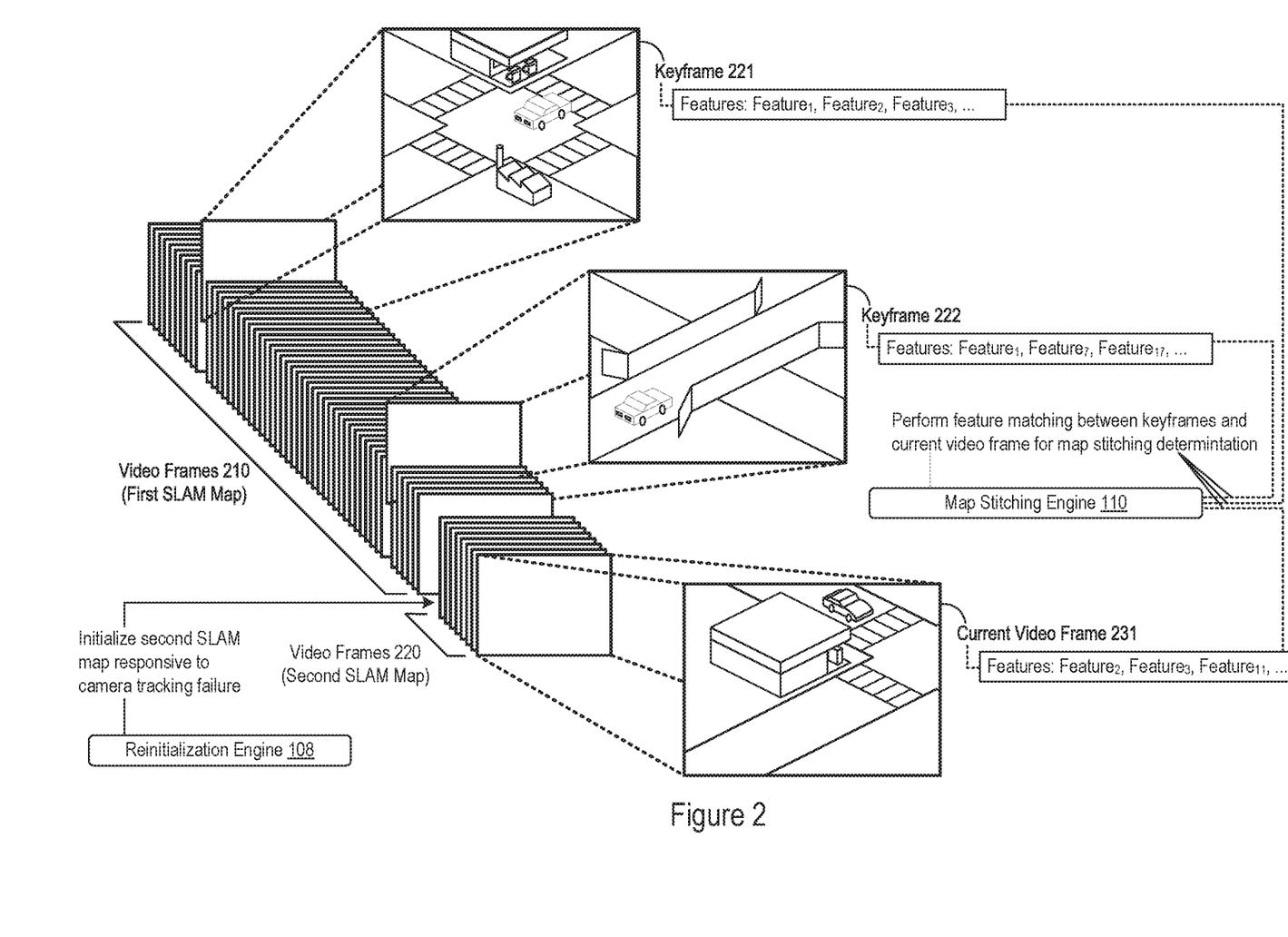
FIGS. 2 and 3 are block diagrams illustrating the system of FIG. 1 in operation according to some examples.
Figure 3:
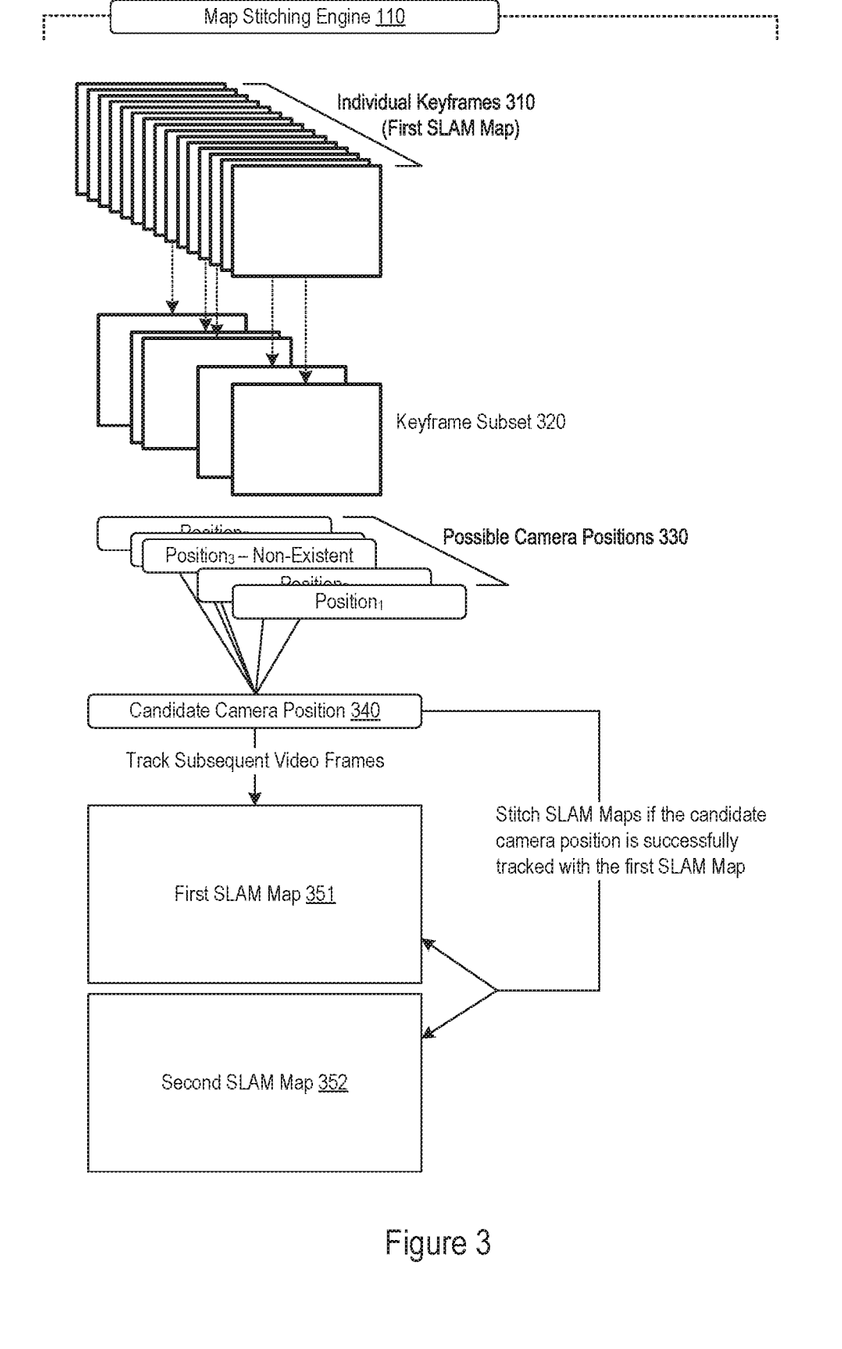

FIGS. 2 and 3 are block diagrams illustrating the system 100 of FIG. 1 in operation according to some examples. FIG. 2 shows operations of the reinitialization engine 108 and some operations of the map stitching engine 110, and FIG. 3 shows additional operations of the map stitching engine 110.

Turning to FIG. 2, the camera may be configured to capture video frames 210 that may be included as part of a first SLAM map. The video frames 210 may include keyframes, such as keyframes 221 and 222. A camera tracking failure may occur in the SLAM process with respect to the first SLAM map. For example, the camera tracking failure may involve the camera's position being lost. This may occur in response to the camera moving quickly to a part of the scene that has not yet been mapped.

The reinitialization engine 108 may be configured to identify the camera tracking failure in the SLAM process with respect to the first SLAM map. In some examples, the tracking failure may be identified based on a difference in features of a new video frame captured after the failure relative to video frames 210 of the first SLAM map. For example, fewer than a threshold number of shared features in expected positions may exist between the last video frame 210 of the first SLAM map and the new post-failure video frame. In other examples, the tracking failure may be identified based at least in part on a known event, such as the camera being turned off for a period of time.

The reinitialization engine 108 may be configured to, responsive to identification of the camera tracking failure, initialize a second SLAM map for the SLAM process. The camera may be configured to capture video frames 220 that may be included as part of the second SLAM map after the second SLAM map is initialized.

Therefore, the first and second SLAM maps may each include a succession of video frames along with an estimation of the positions of each of these features and descriptions of the appearance of the scene at each feature. The positions and descriptions associated with these features may be estimated after capture of the video frames.

The map stitching engine 110 may be configured to access a current video frame 231 of the video frames 220 tracked through the second SLAM map, and to identify matched features between the current video frame 231 and individual keyframes of the first SLAM map to determine a keyframe subset.

The keyframe subset may be determined as follows. First, for each individual keyframe (e.g. keyframes 221 and 222) of the first SLAM map, a number of the matched features between the current video frame 231 of the second SLAM map and the individual keyframe of the first SLAM map may be identified. The matched features may be identified through comparison of sparsely represented feature sets of the video frame and the individual keyframe of the first SLAM map. In some examples, an "approximate nearest neighbor search" algorithm may be used for feature matching, which has a lower computational overhead. Second, the individual keyframe of the first SLAM map may be included in the keyframe subset when the number of matched features exceeds a correlation threshold. In some examples, the correlation threshold may be defined as a threshold number of features matched between the individual keyframe of the first SLAM map and the current video frame 231 from among the video frames 220 of the second SLAM map. In examples where each of the keyframe and the current frame have on the order of hundreds of features, the threshold number may, for example, have a value selected from the range of 20 to 40 features, or any other suitable number of features.

In the example of FIG. 2, keyframe 221 may be included in the keyframe subset, as the correlation threshold for matching features may be exceeded relative to the current video frame 231. The keyframe 221 and the current video frame 231 include some of the same features from some of the same parts of the scene (e.g. both show a car, intersection, and gas station), enough to exceed the correlation threshold, although the camera captured keyframe 221 and the current video frame 232 from different positions (the 3D location in space) and angles (the direction the camera is facing). However, the keyframe 222 may not be included in the keyframe subset, as the correlation threshold for matching features may not be exceeded relative to the current video frame 231. The keyframe 222 and the current video frame 231 include some of the same features (e.g. features associated with the car) but not sufficiently many to exceed the correlation threshold, given that the keyframe 222 and the current video frame 231 show generally different parts of the scene.

Turning to FIG. 3, individual keyframes 310 of the first SLAM map 351 are shown, along with the keyframe subset 320 identified from the set of keyframes 320 of the first SLAM map 351 based on the matched features, as described earlier.

The map stitching engine 110 may be configured to analyze the keyframe subset to determine a candidate camera position 340 from among the keyframe subset 320. The candidate camera position 340 may be a position that matches, to a sufficient degree, a camera's position and angle in the current video frame 231. Thus, if a candidate camera position 340 is identified in the keyframe subset 340, this means that similar features, and similar relative positions of these features, may be apparent from the camera position of the current video frame 231 and from the candidate camera position 340 in a keyframe of the keyframe subset 320. Therefore, the current video frame 231 and keyframe of the keyframe subset 230 may be candidates for stitching together such that the first and second SLAM maps 351 and 352 may be stitched together.

In some examples, the candidate camera position 340 may be determined as follows. For each individual keyframe in the keyframe subset 320, the matched features of the individual keyframe may be analyzed through a random sample consensus (RANSAC) method to determine whether any possible camera positions exist that are consistent with at least a threshold number of the matched features (e.g. the threshold number may be 6 or more matched features). The threshold number may be predetermined and/or configurable. For each individual keyframe in the keyframe subset 320, when multiple possible camera positions exist, one of the possible camera positions for the individual keyframe may be determined. The end result of the foregoing determinations may be that, for each individual keyframe in the keyframe subset 320, there may be one possible camera position or there may be no possible camera position, such that the number of possible camera positions is no greater than the number of individual keyframes the keyframe subset.

The candidate camera position 340 may be selected from among the possible camera positions determined from the individual keyframes according to camera position selection criteria. The camera position selection criteria may, for example, select the possible camera position that is consistent with the greatest number of the matched features, that has a least total feature distance among the matched features, or a combination of both.

The map stitching engine 110 may be configured to track the candidate camera position 340 with respect to the first SLAM map 351 for subsequent video frames (e.g. subsequent to the current video frame 231), and to track the camera position with respect to the second SLAM map 352 for the subsequent video frames (e.g. subsequent to the current video frame 231) while simultaneously tracking the candidate camera position 340 with respect to the first SLAM map 351. In some examples, a threshold number of subsequent frames (e.g. five frames) may be tracked, and in other examples, subsequent frames may be tracked for a threshold period of time. In some examples, the tracked subsequent frames may be consecutive, but in other examples, they may not be consecutive.

In some examples, if the subsequent video frames have a threshold number shared features in expected positions with the first SLAM map 351 (and in some examples, additionally with the second SLAM map 352), then a camera tracking failure has not been experienced. Otherwise, a tracking failure has been experienced.

The map stitching engine 110 may be configured to stitch the first SLAM map 351 to the second SLAM map 352 responsive to tracking the candidate camera position 340 with respect to the first SLAM map 351 for the subsequent video frames without experiencing a camera tracking failure. For example, a combined SLAM map may be created which contains each of the keyframes from both the first and the second SLAM maps 351 and 352, including the current video frame 231, which itself may become a keyframe of the combined SLAM map. However, the map stitching engine 110 may be configured to discard the candidate camera position 340 responsive to experiencing a camera tracking failure when tracking the candidate camera position with respect to the first SLAM map 351 for the subsequent video frames.

As discussed earlier, the map stitching engine 110 may be configured to access a current video frame 231 of the video frames 220 tracked through the second SLAM map, and to identify matched features between the current video frame 231 and individual keyframes of the first SLAM map to determine a keyframe subset. In various examples, the map stitching engine 110 may be configured to, prior to identifying the matched features, identify the individual keyframes of the first SLAM map as either all keyframes of the first SLAM map or as a subset (e.g. a consecutive subset) of all of the keyframes of the first SLAM map. In the first case (i.e. all keyframes), all of the keyframes of the SLAM map will be analyzed for purposes of determining the keyframe subset. This may be performed if the map stitching engine 110 can perform each of its processing tasks in real time while new video frames are captured without falling behind.

In the second case (i.e. subset of keyframes), a subset of keyframes (e.g. keyframes 1-10) rather than all keyframes may be analyzed for purposes of determining the keyframe subset such that the map stitching engine 110 can perform each of its processing tasks in real time while new video frames are captured without falling behind. If stitching fails using the subset, then the map stitching 110 may repeat all of its tasks with a new subset of the keyframes (e.g. keyframes 11-20) to re-attempt stitching when a new current video frame is analyzed.

The map stitching engine 110 may perform each of the above tasks simultaneously while the camera is capturing the video frames 220 and the second SLAM map 352 is being generated. In some examples, the current video frame 231 cannot be used to stitch the first and the second SLAM maps 351 and 352. This may occur, for example, because the current video frame 231 does not have enough matching features with any of the keyframes of the first SLAM map 351, or because a candidate camera position cannot be found between the current video frame 231 and any of the keyframes of the keyframe subset. In this case, the map stitching engine 110 may perform each of the above tasks on the subsequent video frame (which may become the current video frame when captured) simultaneously while the camera is capturing the video frames 220 and the second SLAM map 352 is being generated. New video frames may continue to be processed by the map stitching engine 110 until the first and second SLAM maps 351 and 352 are successfully stitched.

Figure 4:
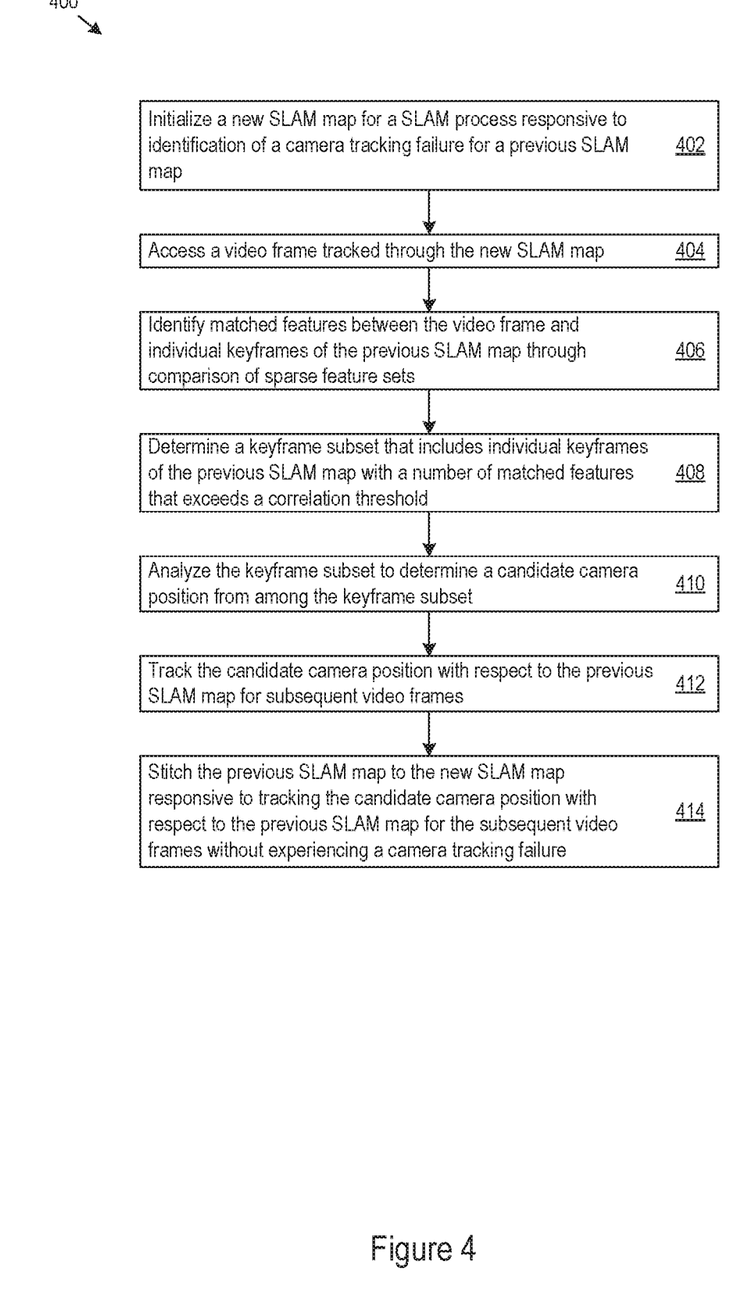
FIG. 4 is a flow diagram illustrating a method according to some examples.

FIG. 4 is a flow diagram illustrating a method 400 according to some examples. In some examples, the orderings shown may be varied, some elements may occur simultaneously, some elements may be added, and some elements may be omitted. In describing FIG. 4, reference will be made to elements described in FIGS. 1-3. In examples, any of the elements described earlier relative to FIGS. 1-3 may be implemented in the process shown in and described relative to FIG. 4. The elements of FIG. 4 may be performed by a simultaneous localization and mapping (SLAM) system including a processor.

At 402, the method 400 may comprise initializing a new SLAM map for a SLAM process responsive to identification of a camera tracking failure for a previous SLAM map.

At 404, the method 400 may comprise accessing a video frame tracked through the new SLAM map.

At 406, the method 400 may comprise identifying matched features between the video frame and individual keyframes of the previous SLAM map through comparison of feature sets. In some examples, the individual keyframes of the previous SLAM map may be identified as all keyframes of the previous SLAM map. In other examples, the individual keyframes of the previous SLAM map may be identified as a consecutive subset of all of the keyframes of the previous SLAM map.

At 408, the method 400 may comprise determining a keyframe subset that includes individual keyframes of the previous SLAM map with a number of matched features that exceeds a correlation threshold.

At 410, the method 400 may comprise analyzing the keyframe subset to determine a candidate camera position from among the keyframe subset. Determining the candidate camera position may comprise (1) for each individual keyframe in the keyframe subset: analyzing the matched features of the individual keyframe through a random sample consensus method to determine whether any possible camera positions exist that are consistent with at least a threshold number of the matched features; and when multiple possible camera positions exist for the individual keyframe, selecting one of the possible camera positions for the individual keyframe according to camera position selection criteria; and (2) selecting the candidate camera position from among the possible camera positions determined from the individual keyframes also according to the camera position selection criteria. The camera position selection criteria may select the possible camera position that is consistent with the greatest number of the matched features, that has a least total feature distance among the matched features, or a combination of both.

At 412, the method 400 may comprise tracking the candidate camera position with respect to the previous SLAM map for subsequent video frames, and tracking another camera position with respect to the new SLAM map for the subsequent video frames while simultaneously tracking the candidate camera position with respect to the previous SLAM map.

At 414, the method 400 may comprise stitching the previous SLAM map to the new SLAM map responsive to tracking the candidate camera position with respect to the previous SLAM map for the subsequent video frames without experiencing a camera tracking failure.

Figure 5:
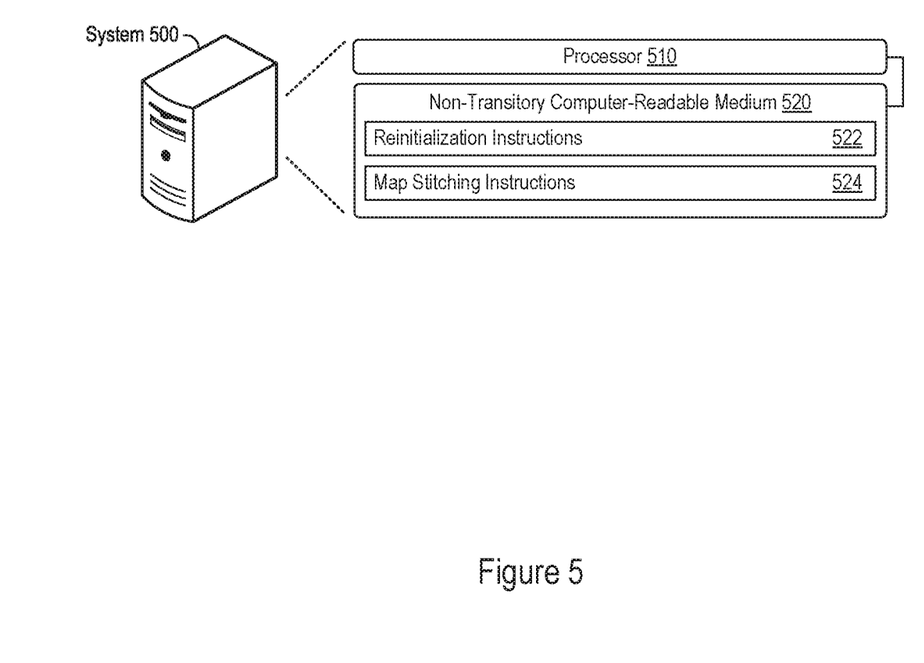
FIG. 5 is a block diagram illustrating a system comprising a processor and a non-transitory computer readable medium according to some examples.

FIG. 5 is a block diagram illustrating a system 500 comprising a processor 510 and a non-transitory computer readable medium 520 according to some examples. The non-transitory computer-readable medium 520 may comprise reinitialization instructions 522 and map stitching instructions 524.

The reinitialization instructions 522 may be executable by the processor 510 to initialize a new simultaneous localization and mapping (SLAM) map for a SLAM process responsive to identification of a camera tracking failure for a previous SLAM map.

The map stitching instructions 524 may be executable by the processor 510 to access a video frame tracked through the new SLAM map.

The map stitching instructions 524 may be executable by the processor 510 to identify matched features between the video frame and individual keyframes of the previous SLAM map through comparison of feature sets. The individual keyframes of the previous SLAM map may be identified as all keyframes of the previous SLAM map. The individual keyframes of the previous SLAM map may be identified as a consecutive subset of all of the keyframes of the previous SLAM map.

The map stitching instructions 524 may be executable by the processor 510 to determine a keyframe subset that includes individual keyframes of the previous SLAM map with a number of matched features that exceeds a correlation threshold.

The map stitching instructions 524 may be executable by the processor 510 to analyze the keyframe subset to determine a candidate camera position from among the keyframe subset. The map stitching instructions 524 may be executable to determine the candidate camera position by: (1) for each individual keyframe in the keyframe subset: analyzing the matched features of the individual keyframe through a random sample consensus method to determine whether any possible camera positions exist that are consistent with at least a threshold number of the matched features; and when multiple possible camera positions exist for the individual keyframe, selecting one of the possible camera positions for the individual keyframe according to camera position selection criteria; and (2) selecting the candidate camera position from among the possible camera positions determined from the individual keyframes also according to the camera position selection criteria. The camera position selection criteria may select the possible camera position that is consistent with the greatest number of the matched features that has a least total feature distance among the matched features, or a combination of both.

The map stitching instructions 524 may be executable by the processor 510 to stitch the previous SLAM map to the new SLAM map responsive to tracking the candidate camera position with respect to the previous SLAM map for the subsequent video frames without experiencing a camera tracking failure.

Any of the processors discussed herein may comprise a microprocessor, a microcontroller, a programmable gate array, an application specific integrated circuit (ASIC), a computer processor, or the like. Any of the processors may, for example, include multiple cores on a chip, multiple cores across multiple chips, and multiple cores across multiple devices, or combinations thereof. In some examples, any of the processors may include at least one integrated circuit (IC), other control logic, other electronic circuits, or combinations thereof. Any of the non-transitory computer-readable storage media described herein may include a single medium or multiple media. The non-transitory computer readable storage medium may comprise any electronic, magnetic, optical, or other physical storage device. For example, the non-transitory computer-readable storage medium may include, for example, random access memory (RAM), static memory, read only memory, an electrically erasable programmable read-only memory (EEPROM), a hard drive, an optical drive, a storage drive, a CD, a DVD, or the like.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject matter disclosed herein. However, examples may be practiced without some or all of these details. Other examples may include modifications and variations from the details discussed above. It is intended that the appended claims cover such modifications and variations.

The invention claimed is:

1. A system comprising:
   a reinitialization engine to:
      identify a camera tracking failure in a simultaneous localization and mapping (SLAM) process with respect to a first SLAM map; and
      responsive to identification of the camera tracking failure, initialize a second SLAM map for the SLAM process; and
   a map stitching engine to:
      access a video frame tracked through the second SLAM map;
      identify a consecutive subset of keyframes that are in consecutive order within the first SLAM map, wherein the first SLAM map includes a sequence of successive video frames comprising a first plurality of video frames that are keyframes and a second plurality of video frames that are not keyframes, wherein the second SLAM map includes a second sequence of successive video frames comprising a third plurality of video frames that are keyframes and a fourth plurality of video frames that are not keyframes, wherein the consecutive subset of keyframes is a subset of a set of all keyframes in the first SLAM map;

identifying, based on sparse feature information, matched features between the video frame and the consecutive subset of keyframes of the first SLAM map;

selecting a keyframe subset from the consecutive subset of keyframes in the first SLAM map based on the matched features, wherein the keyframe subset is a subset of the consecutive subset of keyframes;

analyze the keyframe subset to determine a candidate camera position from among the keyframe subset;

track the candidate camera position with respect to the first SLAM map for subsequent video frames; and stitch the first SLAM map to the second SLAM map responsive to tracking the candidate camera position with respect to the first SLAM map for the subsequent video frames without experiencing a camera tracking failure.

2. The system of claim 1, wherein the map stitching engine is to:

identify a number of matched features between the video frame and the consecutive subset of keyframes based on comparison of a plurality of sparsely represented features of the video frame and the consecutive subset of keyframes; and select the keyframe subset from the consecutive subset of keyframes when the number of matched features exceeds a correlation threshold, wherein the first SLAM map includes information regarding an estimated camera position and an estimated camera orientation for each keyframe included in the first SLAM map.

3. The system of claim 1, wherein the map stitching engine is to identify the matched features through comparison of sparsely represented feature sets of the video frame and individual keyframes of the first SLAM map.

4. The system of claim 1, wherein the map stitching engine is to determine the candidate camera position by:

for each individual keyframe in the keyframe subset:
analyzing the matched features of the individual keyframe through a random sample consensus method to determine whether any possible camera positions exist that are consistent with at least a threshold number of the matched features;
when multiple possible camera positions exist, determining one of the possible camera positions for the individual keyframe; and
selecting the candidate camera position from among the possible camera positions determined from the individual keyframes according to camera position selection criteria.

5. The system of claim 4, wherein the camera position selection criteria selects a possible camera position that is consistent with a greatest number of the matched features, that has a least total feature distance among the matched features, or a combination of both.

6. The system of claim 1, wherein the map stitching engine is to track another camera position with respect to the second SLAM map for the subsequent video frames while simultaneously tracking the candidate camera position with respect to the first SLAM map.

7. The system of claim 1, wherein the map stitching engine is further to discard the candidate camera position responsive to experiencing a camera tracking failure when tracking the candidate camera position with respect to the first SLAM map for the subsequent video frames.

8. A method comprising:

by a simultaneous localization and mapping (SLAM) system including a processor:
initializing a new SLAM map for a SLAM process responsive to identification of a camera tracking failure for a previous SLAM map;
accessing a video frame tracked through the new SLAM map;
responsive to the identification of the camera tracking failure, identifying a consecutive subset of keyframes that are in consecutive order within the previous SLAM map, wherein the consecutive subset of keyframes is a subset of a set of all keyframes included in the previous SLAM map, wherein the previous SLAM map includes a sequence of successive video frames comprising a first plurality of video frames that are keyframes and a second plurality of video frames that are not keyframes, wherein the new SLAM map includes a second sequence of successive video frames comprising a third plurality of video frames that are keyframes and a fourth plurality of video frames that are not keyframes;
identifying matched features between the video frame and the consecutive subset of keyframes through comparison of sparse feature information for the video frame and the consecutive subset of keyframes;
selecting a keyframe subset from the consecutive subset of keyframes with a number of matched features that exceeds a correlation threshold, wherein the keyframe subset is a subset of the consecutive subset of keyframes;
analyzing the keyframe subset to determine a candidate camera position from among the keyframe subset;
tracking the candidate camera position with respect to the previous SLAM map for subsequent video frames; and
stitching the previous SLAM map to the new SLAM map responsive to tracking the candidate camera position with respect to the previous SLAM map for the subsequent video frames without experiencing a camera tracking failure.

9. The method of claim 8, wherein determining the candidate camera position comprises:

for each individual keyframe in the keyframe subset:
analyzing the matched features of the individual keyframe through a random sample consensus method to determine whether any possible camera positions exist that are consistent with at least a threshold number of the matched features; and
when multiple possible camera positions exist for the individual keyframe, selecting one of the possible camera positions for the individual keyframe according to camera position selection criteria; and
selecting the candidate camera position from among the possible camera positions determined from the individual keyframes also according to the camera position selection criteria, wherein the previous SLAM map includes information regarding an estimated camera position and an estimated camera orientation for each keyframe included in the previous SLAM map.

10. The method of claim 9, wherein the camera position selection criteria selects a possible camera position that is consistent with a greatest number of the matched features, that has a least total feature distance among the matched features, or a combination of both.

11. The method of claim 8, further comprising tracking another camera position with respect to the new SLAM map for the subsequent video frames while simultaneously tracking the candidate camera position with respect to the previous SLAM map.

12. A non-transitory computer-readable medium comprising instructions executable by a processor to:
    initialize a new simultaneous localization and mapping (SLAM) map for a SLAM process responsive to identification of a camera tracking failure for a previous SLAM map;
    access a video frame tracked through the new SLAM map;
    responsive to the identification of the camera tracking failure, identify a consecutive subset of keyframes that are in consecutive order within the previous SLAM map, wherein the consecutive subset of keyframes is a subset of a set of all keyframes included in the previous SLAM map, wherein the previous SLAM map includes a sequence of successive video frames comprising a first plurality of video frames that are keyframes and a second plurality of video frames that are not keyframes, wherein the new SLAM map includes a second sequence of successive video frames comprising a third plurality of video frames that are keyframes and a fourth plurality of video frames that are not keyframes;
    identify matched features between the video frame and the consecutive subset of keyframes through comparison of sparse feature information for the video frame and the consecutive subset of keyframes;
    select a keyframe subset from the consecutive subset of keyframes with a number of matched features that exceeds a correlation threshold, wherein the keyframe subset is a subset of the consecutive subset of keyframes;
    analyze the keyframe subset to determine a candidate camera position from among the keyframe subset;
    track the candidate camera position with respect to the previous SLAM map for subsequent video frames; and
    stitch the previous SLAM map to the new SLAM map responsive to tracking the candidate camera position with respect to the previous SLAM map for the subsequent video frames without experiencing a camera tracking failure.

13. The non-transitory computer-readable medium of claim 12, wherein the instructions are executable to determine the candidate camera position by:
    for each individual keyframe in the keyframe subset:
        analyzing the matched features of the individual keyframe through a random sample consensus method to determine whether any possible camera positions exist that are consistent with at least a threshold number of the matched features; and
        when multiple possible camera positions exist for the individual keyframe, selecting one of the possible camera positions for the individual keyframe according to camera position selection criteria; and
    selecting the candidate camera position from among the possible camera positions determined from the individual keyframes also according to the camera position selection criteria, wherein the previous SLAM map includes information regarding an estimated camera position and an estimated camera orientation for each keyframe included in the previous SLAM map.

14. The non-transitory computer-readable medium of claim 13, wherein the camera position selection criteria selects a possible camera position that is consistent with a greatest number of the matched features, that has a least total feature distance among the matched features, or a combination of both.

* * * * *